(12) United States Patent
Lattin

(10) Patent No.: US 8,643,216 B2
(45) Date of Patent: Feb. 4, 2014

(54) ELECTRICAL STORAGE ELEMENT CONTROL SYSTEM FOR A VEHICLE

(75) Inventor: Robert M. Lattin, Minneapolis, MN (US)

(73) Assignee: Thermo King Corporation, Minneapolis, MN (US)

( * ) Notice: Subject to any disclaimer, the term of this patent is extended or adjusted under 35 U.S.C. 154(b) by 449 days.

(21) Appl. No.: 12/534,008

(22) Filed: Jul. 31, 2009

(65) Prior Publication Data

US 2011/0027626 A1 Feb. 3, 2011

(51) Int. Cl.
*H02J 7/00* (2006.01)
*H02J 9/00* (2006.01)
*B60L 1/00* (2006.01)

(52) U.S. Cl.
USPC ............. 307/65; 307/66; 307/9.1; 307/10.1

(58) Field of Classification Search
USPC ..................... 307/9.1, 10.1, 65, 66
See application file for complete search history.

(56) References Cited

U.S. PATENT DOCUMENTS

| | | |
|---|---|---|
| 3,545,222 A | 12/1970 | Petranek |
| 3,946,574 A | 3/1976 | Portera |
| 3,974,660 A | 8/1976 | Farr |
| 4,015,182 A | 3/1977 | Erdman |
| 4,280,330 A | 7/1981 | Harris et al. |
| 4,459,519 A | 7/1984 | Erdman |
| 4,864,154 A | 9/1989 | Copeland et al. |
| 4,909,044 A | 3/1990 | Gudmundsen |
| RE33,687 E | 9/1991 | Greer |
| 5,333,678 A | 8/1994 | Mellum et al. |
| 5,497,941 A | 3/1996 | Numazawa et al. |
| 5,555,737 A | 9/1996 | Takeo et al. |
| 5,619,862 A | 4/1997 | Ruger et al. |
| 5,896,750 A | 4/1999 | Karl |

(Continued)

FOREIGN PATENT DOCUMENTS

| | | |
|---|---|---|
| DE | 10055531 | 1/2002 |
| EP | 0609101 | 8/1994 |

(Continued)

OTHER PUBLICATIONS

PCT/US2010/043577 European Search Report and Written Opinion dated Oct. 17, 2013 (6 pages).

*Primary Examiner* — Rexford Barnie
*Assistant Examiner* — Dru Parries
(74) *Attorney, Agent, or Firm* — Michael Best & Friedrich LLP

(57) ABSTRACT

An electrical storage element control system for a vehicle. The control system includes electrical storage elements electrically coupled to each other in parallel, switch devices, and a controller. Each of the electrical storage elements defines a total storage capacity and having a state of charge cooperatively defining a total stored charge, and is adapted to be in electrical communication with an electrical load and a power source. The switch devices are electrically coupled to the electrical storage elements such that each switch device is associated with a corresponding electrical storage element and is operable between connected and disconnected states. The controller is in electrical communication with the switch devices to selectively vary each of the switch devices between the connected state and the disconnected state to connect and disconnect one or more of the electrical storage elements relative to the load based on the total stored charges and relative to the power source based on the total storage capacities of the electrical storage elements.

31 Claims, 2 Drawing Sheets

(56) References Cited

U.S. PATENT DOCUMENTS

| | | |
|---|---|---|
| 5,899,081 A | 5/1999 | Evans et al. |
| 5,901,572 A | 5/1999 | Peiffer et al. |
| 6,038,877 A | 3/2000 | Peiffer et al. |
| 6,059,016 A | 5/2000 | Rafalovich et al. |
| 6,094,926 A | 8/2000 | Nakayama et al. |
| 6,276,161 B1 | 8/2001 | Peiffer et al. |
| 6,281,662 B1 | 8/2001 | Flohr |
| 6,351,957 B2 | 3/2002 | Hara |
| 6,412,293 B1 | 7/2002 | Pham et al. |
| 6,453,678 B1 | 9/2002 | Sundhar |
| 6,457,324 B2 | 10/2002 | Zeigler et al. |
| 6,470,960 B2 | 10/2002 | Kampf et al. |
| 6,626,003 B1 | 9/2003 | Kortuem et al. |
| 6,681,588 B2 | 1/2004 | Zeigler |
| 6,688,121 B2 | 2/2004 | Tada et al. |
| 6,688,125 B2 | 2/2004 | Okamoto et al. |
| 6,701,221 B1 | 3/2004 | Eaton et al. |
| 6,731,098 B1 | 5/2004 | Hintz et al. |
| 6,745,585 B2 | 6/2004 | Kelm et al. |
| 6,755,041 B2 | 6/2004 | Wessells et al. |
| 6,796,367 B2 | 9/2004 | Blacquiere et al. |
| 6,814,299 B1 | 11/2004 | Carey |
| 6,838,858 B2 | 1/2005 | Berneis et al. |
| 6,874,695 B2 | 4/2005 | Baker et al. |
| 6,889,762 B2 | 5/2005 | Zeigler et al. |
| 6,980,911 B2 | 12/2005 | Eaton et al. |
| 7,005,760 B2 | 2/2006 | Eaton et al. |
| 7,007,491 B2 | 3/2006 | Grimm et al. |
| 7,030,580 B2 | 4/2006 | Hoff |
| 7,042,180 B2 | 5/2006 | Terry et al. |
| 7,055,486 B2 | 6/2006 | Hoff et al. |
| 7,092,848 B2 | 8/2006 | Hoff et al. |
| 7,114,482 B2 | 10/2006 | Lane |
| 7,151,326 B2 * | 12/2006 | Jordan ............... 307/22 |
| 7,189,158 B2 | 3/2007 | Motszko et al. |
| 7,234,315 B2 | 6/2007 | Allen et al. |
| 7,237,397 B2 | 7/2007 | Allen |
| 7,259,469 B2 | 8/2007 | Brummett et al. |
| 7,259,481 B2 | 8/2007 | Eaton et al. |
| 7,276,815 B2 | 10/2007 | Algrain et al. |
| 7,316,119 B2 | 1/2008 | Allen |
| 7,400,059 B2 | 7/2008 | Algrain et al. |
| 7,424,343 B2 | 9/2008 | Kates |
| 7,448,227 B2 | 11/2008 | Zeigler et al. |
| 7,454,922 B2 | 11/2008 | Zeigler et al. |
| 7,462,970 B2 | 12/2008 | Hoff et al. |
| 7,591,143 B2 | 9/2009 | Zeigler et al. |
| 7,591,303 B2 | 9/2009 | Zeigler et al. |
| 7,888,820 B2 * | 2/2011 | Dunnmon et al. ............ 307/65 |
| 2003/0070849 A1 | 4/2003 | Whittaker |
| 2004/0168454 A1 | 9/2004 | Iritani |
| 2004/0187505 A1 | 9/2004 | Hoff et al. |
| 2004/0187834 A1 | 9/2004 | Hoff et al. |
| 2004/0189099 A1 | 9/2004 | Wild |
| 2004/0231831 A1 | 11/2004 | Houck et al. |
| 2005/0016713 A1 | 1/2005 | Houck et al. |
| 2005/0035740 A1 | 2/2005 | Elder et al. |
| 2005/0063121 A1 | 3/2005 | Jordan |
| 2005/0135034 A1 | 6/2005 | Johnson et al. |
| 2005/0161221 A1 | 7/2005 | Diamond et al. |
| 2006/0173586 A1 | 8/2006 | Swanson |
| 2007/0052241 A1 | 3/2007 | Pacy |
| 2007/0131408 A1 | 6/2007 | Zeigler et al. |
| 2007/0151273 A1 | 7/2007 | Nelson et al. |
| 2007/0179015 A1 | 8/2007 | Johnson et al. |
| 2007/0221370 A1 | 9/2007 | Allen et al. |
| 2008/0006045 A1 | 1/2008 | Brummett |
| 2008/0072859 A1 | 3/2008 | Esaka et al. |
| 2008/0110189 A1 | 5/2008 | Alston et al. |
| 2008/0136257 A1 | 6/2008 | Flanigan et al. |
| 2008/0163633 A1 | 7/2008 | Magri et al. |
| 2008/0164082 A1 | 7/2008 | Foreman |
| 2008/0196436 A1 | 8/2008 | Connell et al. |
| 2008/0196877 A1 | 8/2008 | Zeigler et al. |
| 2008/0257622 A1 | 10/2008 | Teschner et al. |
| 2009/0145674 A1 * | 6/2009 | Lee et al. ............ 180/65.1 |

FOREIGN PATENT DOCUMENTS

| | | |
|---|---|---|
| EP | 1024038 | 2/2000 |
| EP | 1759929 | 3/2007 |
| EP | 1958851 | 8/2008 |
| WO | 9701725 | 1/1997 |

* cited by examiner

ELECTRICAL STORAGE ELEMENT CONTROL SYSTEM FOR A VEHICLE

BACKGROUND

The present invention relates to a control system for electrical storage elements of a vehicle, and more particularly, the present invention relates to a control system for controlling power into and out of the electrical storage elements.

Large vehicles (e.g., semi-tractors, trucks, etc.) are commonly used to transport cargo. Existing tractors in a tractor-trailer combination typically include cabins that are conditioned by an air conditioning system. Often, electrical energy from the power source is stored in one or more batteries of the vehicle to provide stored electrical energy for later use when a power source is unavailable. In some vehicles, groups of batteries are provided for supplying power to electrical components of the vehicle. These groups of batteries are often electrically connected to a power source in a parallel relationship.

Typically, existing battery charging control systems charge an entire group of parallel-connected batteries by connecting a single power source to the entire group of batteries. When these batteries have relatively large charge acceptance capacities (i.e., low internal resistance), the current acceptance of the batteries often exceeds the current supplied from the power source. In addition, these conventional control systems control the supply voltage to protect against over-current charging conditions, which can be detrimental to battery life. Often, these conventional control systems do not provide an appropriate initial amount of current to the batteries, limiting the battery life of the batteries.

By charging entire groups of batteries at the same time, conventional battery charging control systems typically necessitate that each of the batteries in the group have the same electrical characteristics (e.g., internal resistance, tolerances, architecture, etc.). When the electric current demand from each of the batteries exceeds the current capacity of the power source that is charging the batteries, the power source and/or the batteries may be damaged or operate inefficiently. Excessive electric current demand from the group of batteries may also provide inadequate charging of the batteries, lowering the electrical storage capacity of the batteries and/or the cycling capability of the batteries.

SUMMARY

In one construction, the invention provides an electrical storage element control system for a vehicle that has an electrical load defining a load draw. The control system includes a plurality of electrical storage elements electrically coupled to each other in parallel, a plurality of switch devices, and a controller. Each of the plurality of electrical storage elements defines a total storage capacity and has a state of charge cooperatively defining a total stored charge and is adapted to be in electrical communication with the load and a power source that defines a power capacity. The plurality of switch devices are electrically coupled to the plurality of electrical storage elements such that each switch device of the plurality of switch devices is associated with a corresponding electrical storage element and is operable between a connected state and a disconnected state. The controller is in electrical communication with the plurality of switch devices to selectively vary each of the switch devices between the connected state and the disconnected state to selectively connect and disconnect one or more of the electrical storage elements relative to the load based on the total stored charges and relative to the power source based on the total storage capacities of the electrical storage elements.

In another construction, the invention provides an electrical storage element control system for a vehicle that has an electrical load defining a load draw. The control system includes a first electrical storage element that defines a total storage capacity and has a state of charge cooperatively defining a first total stored charge, and that is adapted to be in electrical communication with the load and a power source defining a power capacity, and a second electrical storage element electrically coupled in parallel relationship to the first electrical storage element. The second electrical storage element defines a total storage capacity and has a state of charge cooperatively defining a second total stored charge, and that is adapted to be in electrical communication with the load and the power source. The control system also includes a first switch device, a second switch device, and a controller that is in electrical communication with the first and second switch devices. The first switch device is electrically coupled to the first electrical storage element, and is operable between a connected state for connecting the first electrical storage element to either the load or the power source, and a disconnected state for disconnecting the first electrical storage element from the load or the power source. The second switch device is electrically coupled to the second electrical storage element and is operable between a connected state for connecting the second electrical storage element to either the load or the power source, and a disconnected state for disconnecting the second electrical storage element from either the load or the power source. The controller is operable to selectively vary the first switch device and the second switch device between the connected state and the disconnected state relative to the power source based on the total storage capacity of the first electrical storage element and the total storage capacity of the second electrical storage element, and further based on the power capacity of the power source. The controller is also operable to selectively vary the first switch device and the second switch device between the connected state and the disconnected state relative to the load based on the first total stored charge and the second total stored charge, and further based on the load draw.

In yet another construction, the invention provides a method of controlling electrical storage elements for a vehicle that has an electrical load defining a load draw. The method includes providing a plurality of electrical storage elements electrically coupled to each other in parallel, with each of the plurality of electrical storage elements defining a total storage capacity and having a state of charge cooperatively defining a total stored charge. The method also includes selectively connecting and disconnecting at least one of the plurality of electrical storage elements relative to the load based on the total stored charge of each of the selectively connected electrical storage elements and the load draw during a discharge phase of the electrical system, and selectively connecting and disconnecting at least one of the plurality of electrical storage elements relative to the power source based on the total storage capacity of the selectively connected electrical storage elements and the power capacity during a charge phase of the electrical system.

In yet another construction, the invention provides a method of controlling an output of a power source for an electrical storage element control system of a vehicle during a charge phase. The method includes providing a plurality of electrical storage elements electrically coupled to each other in parallel, with each of the plurality of electrical storage elements defining a total storage capacity and having a state of charge cooperatively defining a total stored charge, and determining a state of the total stored charge of each of the plurality of electrical storage elements. The method also includes selectively connecting at least one of the plurality of electrical storage elements to the power source based on the total storage capacity of the selectively connected electrical storage elements and a power capacity of the power source, modifying an output of the power source based on the state of the total stored charge of the at least one selectively connected electrical storage element, and charging the at least one selectively connected electrical storage elements.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
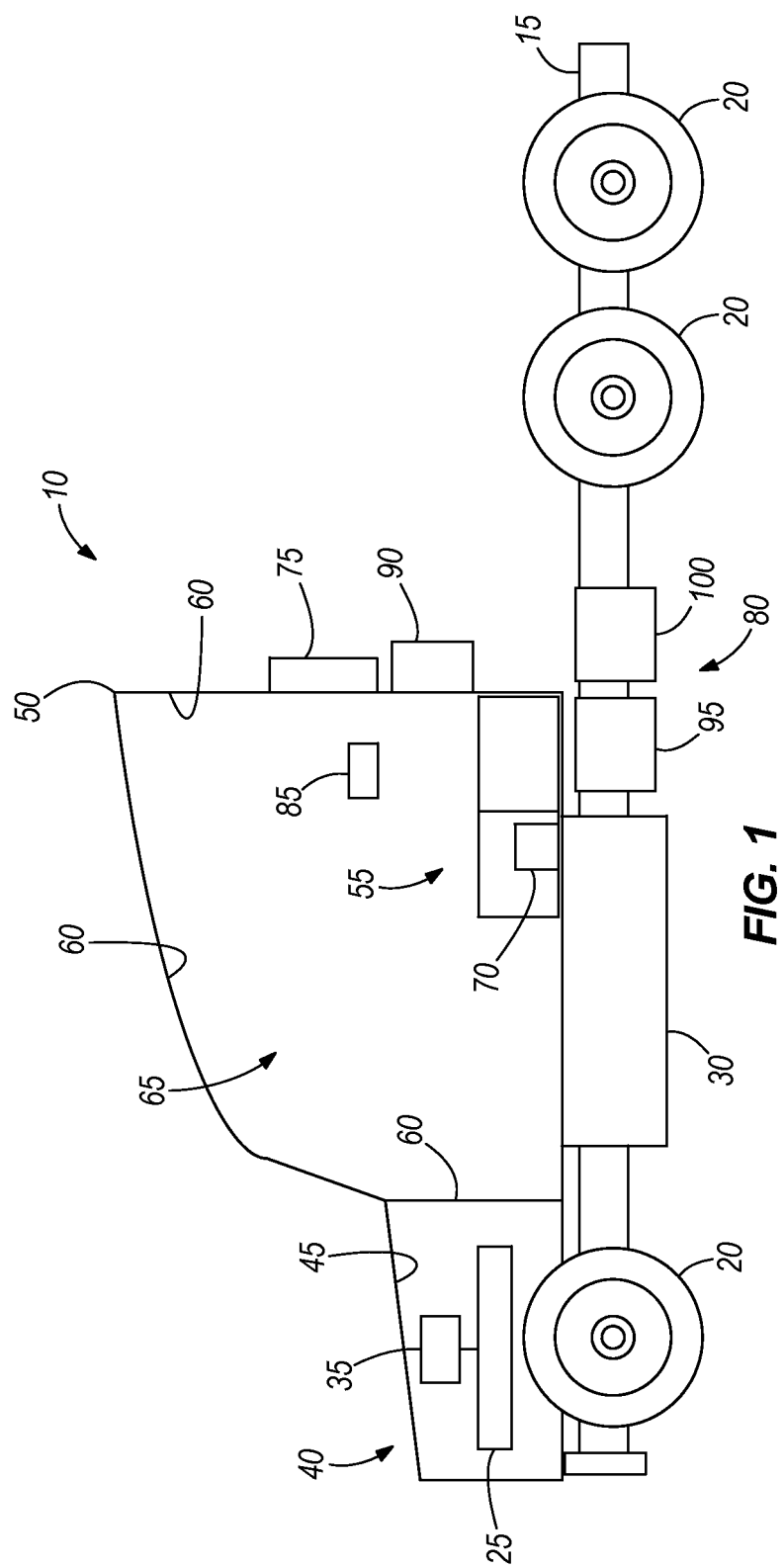
FIG. 1 is a schematic view of a vehicle including a control system, a plurality of electrical storage elements, a power source, and an air conditioning system.

FIG. 1 shows a vehicle 10 for over-the-road operation embodying the invention. The illustrated vehicle 10 is a semitractor that is used to transport cargo stored in a cargo compartment (e.g., a container, a trailer, etc.) or people to one or more destinations, although other vehicles (e.g., a straight truck, a van, a bus, a car, etc.) are also considered. Hereinafter, the term "vehicle" shall be used to represent all such vehicles, and shall not be construed to limit the invention's application solely to a tractor in a tractor-trailer combination.

The vehicle 10 includes a frame 15, wheels 20, a prime mover 25, a fuel reservoir 30, and a direct current ("DC") generator or alternator 35. The wheels 20 are rotatably coupled to the frame 15 to permit movement of the vehicle 10. The alternator 35 is coupled to the prime mover 25 so that mechanical energy produced by the prime mover 25 can be converted into electrical energy, or electricity. The alternator 35 and the prime mover 25 cooperate to define a first electrical power source 40 for the vehicle 10. The first power source 40 is operable in an "On" state and an "Off" state (e.g., when the first power source 40 is in standby mode or disconnected), and has a first power capacity that is based on the available electrical power (e.g., electrical charge) from the alternator 35 at a predetermined voltage.

The prime mover 25 is coupled to the frame 15 and is disposed in a compartment 45 adjacent a forward end of the vehicle 10. The prime mover 25 is in communication with one or more of the wheels 20 to drive the vehicle 10. The prime mover 25 is operable in a first mode and a second mode, and includes an "On" state and an "Off" state. The first mode corresponds to the prime mover 25 being engaged so that power is provided to the wheels 20 so that the vehicle 10 can be driven in the first mode. The first mode further corresponds to when the prime mover 25 is idling, but is not engaged so that the operator can drive the vehicle 10. In other words, the prime mover 25 is operable in the first mode when the prime mover 25 is in the "On" state. The prime mover 25 is in the second mode during standby operation of the vehicle 10 (e.g., when the vehicle is parked, etc.). Generally, standby operation of the vehicle 10 corresponds to the prime mover 25 being disengaged. In other words, the prime mover 25 is in the second mode when the prime mover 25 is in the "Off" state.

Referring to FIG. 1, the vehicle 10 also includes a cabin 50 and a heating, ventilation, and air conditioning ("HVAC") system 55. The cabin 50 is supported on the frame 15 rearward of the compartment 45 and includes walls 60 that define a space 65. In some constructions, the space 65 may be divided into a driving portion and a sleeping portion. The HVAC system 55 is coupled to the vehicle 10 and is in communication with the cabin 50 to condition the space 65. The illustrated vehicle 10 includes a single HVAC system 55 that is located adjacent and in communication with the space 65. In other constructions, the HVAC system 55 can be positioned in the vehicle to condition the sleeping portion, and another HVAC system can be positioned in the vehicle to condition the driving portion. Generally, the number of HVAC systems in the vehicle depends at least in part on the size and number of zones to be conditioned within the cabin.

The HVAC system 55 defines an exemplary electrical load of the vehicle 10. The vehicle 10 also may include other electrical loads (e.g., vehicle accessories, lights, etc.). Generally, the electrical load has predetermined power characteristics that define a load draw, which corresponds to the electrical power that is necessary for adequately powering the load. The HVAC system is operable in an "on" state (e.g., an active state) and an "off" state (e.g., an inactive or disconnected state).

Components of the HVAC system 55 can be located anywhere on the vehicle 10. In the illustrated construction, the HVAC system 55 includes an evaporator assembly 70 that is located in the cabin 50 to condition the space 65, and a condenser assembly 75 that is coupled to one of the walls 60 on an exterior side of the cabin 50 to provide heat exchange between refrigerant in the HVAC system 55 and an ambient environment. In some constructions, the components of the HVAC system 55 can be assembled together into a single, unitary package. In other constructions, each component of the HVAC system 55 can be separate from the other components of the HVAC system 55.

Figure 2:
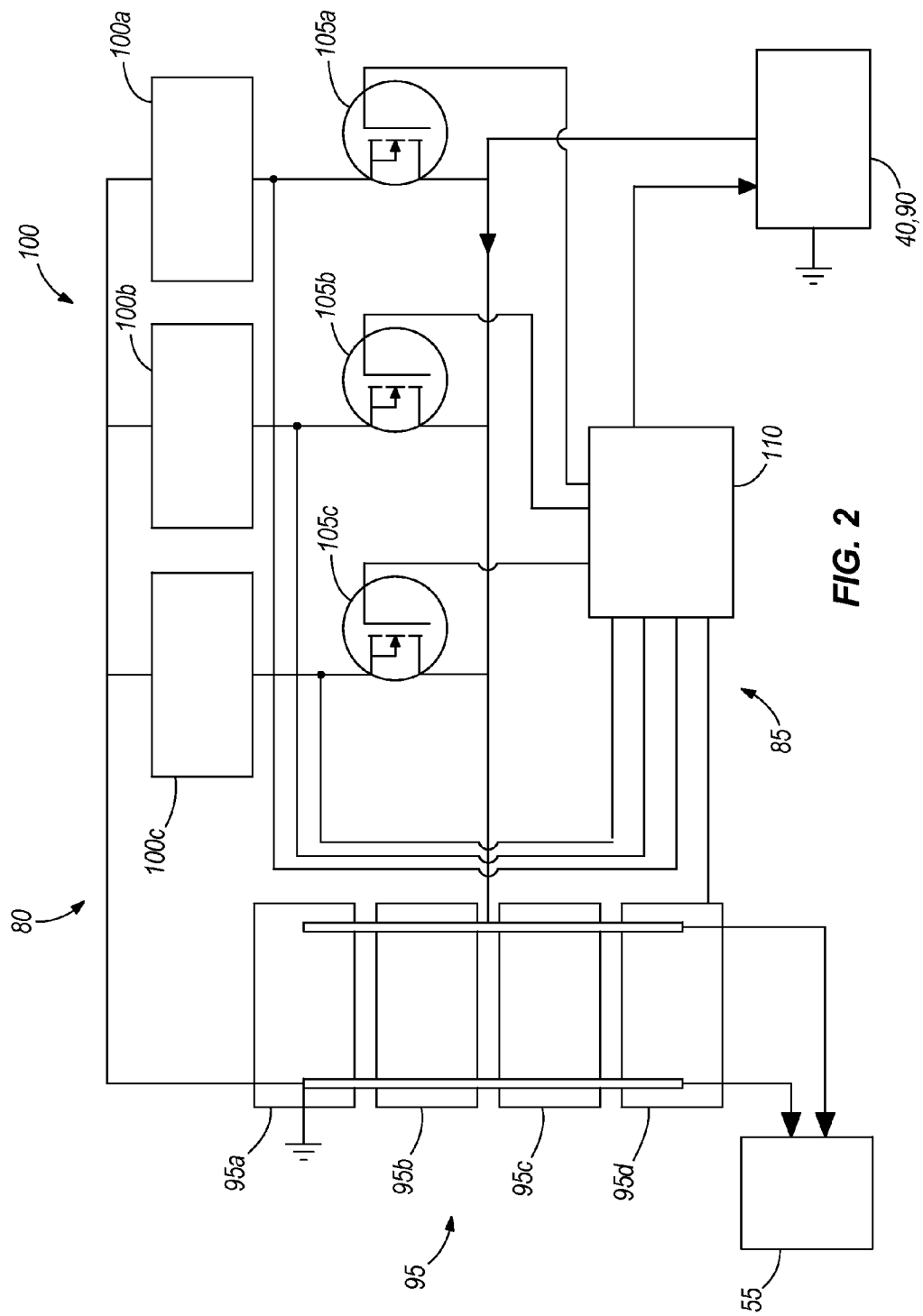
FIG. 2 is a schematic view of the control system and the plurality of electrical storage elements.

FIGS. 1 and 2 show that the vehicle 10 also includes an electrical storage system 80 and a control system 85 in communication with the electrical storage system 80. The electrical storage system 80 is in electrical communication with the electrical load of the vehicle (e.g., the HVAC system 55) to provide adequate power to the electrical load based on the load draw. The electrical storage system 80 also is in electrical communication with the first power source 40 for receiving electrical power when the prime mover 25 is in the first mode. The electrical storage system 80 also may be in selective electrical communication with a second electrical power source 90 in addition to or in lieu of the first power source 40 for receiving electrical power from the second power source 90. In the illustrated construction, the second power source 90 can include shore power, a photovoltaic device, a fuel cell, a wind generator, or other sources of power. The second power source 90 is operable in an "On" state and an "Off" state (e.g., when the second power source 90 is in standby mode or disconnected), and has a second electrical power capacity that is based on the available electrical power (e.g., electrical charge) from the power source at a predetermined voltage.

Each of the first power source 40 and the second power source 90 defines a connected power source when the respective power sources 40, 90 are connected to the electrical storage system 80 (e.g., when either or both of the power sources 40, 90 are in the "On" state). Each of the first power source 40 and the second power source 90 defines a disconnected power source (e.g., when the power source is in the "Off" state or in the standby mode) when the respective power sources 40, 90 are disconnected from the electrical storage system 80. One or both of the first power source 40 and the second power source 90 can be connected to or disconnected from the electrical storage system 80.

The electrical storage system 80 is operable in a charge phase, a discharge phase, and a standby phase, and includes a first plurality of electrical storage elements or batteries 95 and a second plurality of electrical storage elements or batteries 100. The batteries 95, 100 receive and store electrical energy from one or both of the first power source 40 from the second power source 90 during the charge phase, and discharge or deliver power (e.g., electrical discharge) to the electrical load during the discharge phase. The batteries 95, 100 are in the standby phase when the first power source 40 and the second power source are in the respective "Off" states and the batteries 95, 100 are disconnected from the load. The batteries 100 can be used to power one or more dedicated loads, or to assist the batteries 95 in providing power to the same load or loads.

In the illustrated construction, the first plurality of batteries 95 comprises existing batteries of the vehicle 10, and the second plurality of batteries 100 comprises separate, additional batteries for the vehicle 10. In other constructions, the first plurality of batteries 95 and the second plurality of batteries 100 may be included on the vehicle 10 as separate batteries in addition to existing vehicle batteries. As shown in FIG. 2, the first plurality of batteries 95 defines a first bank of batteries that includes four batteries 95a, 95b, 95c, 95d arranged in parallel relationship with each other. In some constructions, the first plurality of batteries 95 may include fewer or more than four batteries. In other constructions, some of the batteries 95a-d may be electrically connected in series with each other. The second plurality of batteries 100 defines a second bank of batteries that includes three batteries 100a, 100b, 100c arranged in parallel relationship with the first plurality of batteries 95 and with each other. In some constructions, some of the batteries 100a-c may be electrically connected in series with each other. In other constructions, the second plurality of batteries 100 may include fewer or more than three batteries.

Each battery 95a-d, 100a-c defines a total storage capacity or battery capacity that is at least partially based on predetermined design characteristics (e.g., capacity, charge voltage, charge interval, etc.), environmental conditions in which the batteries are implemented (e.g., temperature or humidity of the surrounding environment, etc.), and time-related conditions (e.g., battery aging). The first and second banks of batteries 95, 100 can have substantially the same or different design characteristics (e.g., capacity, charge voltage, charge interval, etc.). The total storage capacity of each of the batteries 95a-d, 100a-c is the amount of electrical energy that the respective batteries 95a-d, 100a-c are able to store for later use.

Each battery 95a-d, 100a-c has a state of charge (e.g., 40 percent charge, 90 percent charge, etc.) based on the predetermined design characteristics and the amount of electrical energy that is stored in each of the batteries 95a-d, 100a-c. Generally, the state of charge is a ratio of the amount of stored electrical energy in each of the batteries 95a-d, 100a-c relative to the total storage capacity of the associated battery 95a-d, 100a-c. The state of charge and the total storage capacity for each battery 95a-d, 100a-c cooperate to define an energy potential or total stored charge of the associated battery 95a-d, 100a-c. In the discharge phase, the total stored charge corresponds to the amount of electrical charge that each battery 95a-d, 100a-c can supply to the load over a period of time. In the charge phase, the total stored charge corresponds to the amount of electrical charge that the batteries 95a-d, 100a-c have received and stored from the connected power source. For example, when the state of charge of one or more of the batteries 95a-d, 100a-c is 100% of the total storage capacity, the corresponding total stored charge is equal to the total storage capacity (i.e., the battery 95a-d, 100a-c has a full charge). When the state of charge of one or more of the batteries 95a-d, 100a-c is 50% of the total storage capacity, the corresponding total stored charge is equal to 50% of the total storage capacity. Each of the batteries 95a-d, 100a-c may have substantially the same or different predetermined design characteristics depending on desired electrical storage characteristics of the respective batteries 95a-d, 100a-c such that the total stored charges of each of the batteries 95a-d, 100a-c may be the same or different relative to each other. In constructions of the vehicle 10 in which some or all of the batteries 95a-d, 100a-c have substantially the same predetermined design characteristics, the total storage capacities will be substantially the same for these batteries 95a-d, 100a-c. The total stored charge that is defined by the total storage capacity and the state of charge for each battery 95a-d cooperatively define an aggregate or first total stored charge of the first plurality of batteries 95. The total stored charge that is defined by the total storage capacity and the state of charge for each battery 100a-c cooperatively define an aggregate or second total stored charge of the second plurality of batteries 100 such that the second total stored charge of the second plurality of batteries 95 may be incremented based on the respective total stored charges of the individual batteries 100a-c.

Generally, the total stored charge of each battery 95a-d, 100a-c corresponds to the amount of energy that is stored during the charge phase and the power that can be provided or supplied to the load in the discharge phase. The total stored charge of each battery 95a-d, 100a-c correlates to an associated discharge capacity in the discharge phase, and the total storage capacity of each battery 95a-d, 100a-c corresponds to an associated charge capacity in the charge phase.

FIGS. 1 and 2 show that the control system 85 includes solid state switch devices 105a, 105b, 105c that are coupled to the second plurality of batteries 100, and a controller 110 that is electrically coupled to the switch devices 105a-c. In the illustrated construction, the control system 85 includes three solid state switch devices 105a-c, where each of the switch devices 105a-c is associated with one of the batteries 100a-c. In other constructions, some or all of the switch devices 105a-c may be associated with two or more of the batteries 100a-c (e.g., sub-groups of the second plurality of batteries 100). The switch devices 105a-c are operable between a connected state and a disconnected state by the controller 110. In the connected state, each of the switch devices 105a-c electrically connects the associated battery 100a-c to the connected power source during the charge phase and to the electrical load during the discharge phase. In the disconnected state, each of the switch devices 105a-c electrically disconnects the associated battery 100a-c from the connected power source during the charge phase and from the electrical load during the discharge phase.

The controller 110 is in electrical communication with the connected power source to determine the power capacity of the connected power source. The controller 110 also is in electrical communication with the first plurality of batteries 95 and the second plurality of batteries 100 to determine one or more operating conditions of the respective batteries 95a-d, 100a-c based on power characteristics (e.g., voltage input, voltage output, current input, current output, etc.) of the batteries 95a-d, 100a-c. The controller 110 is operable to control the supply or output of power (e.g., voltage or current output) from the power sources 40, 90 to the first plurality of batteries 95 and the second plurality of batteries 100 based on the operating conditions of the batteries 95a-d, 100a-c that are connected to the power source and the power capacity of the connected power source. The operating conditions determined by the controller 110 can include whether one or more of the first plurality of batteries 95 and the second plurality of batteries 100 are subjected to an over-current condition or an under-current condition during the charge phase, and whether one or both of the first total stored charge and the second total stored charge are adequate for supplying power to the electrical load. The operating conditions also may include other characteristics of the first plurality of batteries 95 and the second plurality of batteries 100 (e.g., voltage conditions, battery life, charge capacity, battery load, etc.) Generally, the operating conditions are indicative of a state of the total stored charges of the respective batteries 95a-d, 100a-c (e.g., a relatively low charge, a relatively high charge, etc.).

The controller 110 is further in electrical communication with the second plurality of batteries 100 via the switch devices 105a-c to independently control and selectively connect and disconnect each battery 100a-c relative to the first power source 40 and/or the second power source 90 during the charge phase. The controller 110 is also operable to independently and selectively connect and disconnect each battery 100a-c relative to the electrical load during the discharge phase.

In operation, the first plurality of batteries 95 and the second plurality of batteries 100 are charged by the connected power source during the charge phase, and supply or provide electrical power to the electrical load during the discharge phase. The first plurality of batteries 95 are continuously electrically coupled to the connected power source (e.g., the first power source and/or the second power source) independent of the second plurality of batteries 100 during the charge phase for storing electrical power from the connected power source. The batteries 95a-d, as existing batteries on the vehicle 10, also are continuously electrically coupled to the electrical load independent of the second plurality of batteries 100 during the discharge phase for discharging power to the load. In other constructions, the batteries 95a-d may be selectively and/or independently connected to the load or the connected power source.

During the charge phase, each battery 100a-c is independently and selectively electrically coupled to the connected power source by the controller 110 via the associated switch device 105a-c for storing electrical power from the connected power source based on the respective total storage capacities and the total stored charges for the batteries 100a-c, and the power capacity of the connected power source. During the discharge phase, each battery 100a-c is independently and selectively electrically coupled to the electrical load by the controller 110 via the associated switch device 105a-c for discharging power to the load based on the respective total stored charges and the load draw.

At the beginning of the charge phase (i.e., when the first power source 40 and/or the second power source 90 is initially connected to the electrical storage system 80), the first plurality of batteries 95 are electrically connected to the connected power source so that the first plurality of batteries 95 can be charged. The controller 110 determines the state of the respective total stored charges of the batteries 95a-d based on the power characteristics of the batteries, and manages the power output provided by the connected power source so that the power output is tailored to the state of the total stored charges of the first plurality of batteries 95 to avoid adverse charging conditions (e.g., over-current conditions, over-voltage conditions, etc.).

In addition, some, all, or none of the batteries 100a-c may be connected to the connected power source at the beginning of the charge phase depending on the state of the total stored charges of the first plurality of batteries 95 and the power capacity of the connected power source. Generally, the controller 110 selectively varies the switch devices 105a-c between the connected state and the disconnected state based on the power capacity of the connected power source and the state of the total stored charges of the respective batteries to be connected to the power source to tailor the power output of the power source to the operating conditions of the batteries.

For example, when the state of the total stored charge for one or more of the batteries 95a-d, 100a-c that are connected to the power source is below a first predetermined charge threshold, the power output of the connected power source can be decreased to limit the power (e.g., current, voltage) supplied to the connected batteries 95a-d, 100a-c. When the state of the total stored charge for one or more of the batteries 95a-d, 100a-c that are connected to the power source is above a second predetermined charge threshold, the power output of the connected power source can be increased to charge the connected batteries 95a-d, 100a-c without exceeding the power output of the power source.

When the total storage capacities of the batteries 95a-d substantially correspond to or are substantially the same as the power capacity of the connected power source, the batteries 95a-d are charged by the connected power source and the controller 110 disconnects (or maintains disconnection of) the second plurality of batteries 100 from that power source. When the controller 110 determines that power capacity of the power source exceeds the aggregate total storage capacity of the first plurality of batteries 95 (e.g., when the batteries of the first plurality of batteries 95 are partially or fully charged), the controller 110 varies at least one of the switch devices 105a-c to the connected state to charge the associated battery 100a-c. Depending on the difference between the power capacity of the power source and the total storage capacities of the batteries 95a-d, the controller 110 may electrically connect some or all of the batteries 100a-c to the power source by varying some or all of the respective switch devices 105a-c to the connected state. The controller 110 tailors the power output of the connected power source to the state of the respective total stored charges of the batteries 100a-c based on the determined operating conditions to avoid over-current or over-voltage conditions, or other adverse conditions affecting the life of the batteries 100a-c.

When the controller 110 determines that the power capacity of the connected power source is lower than the combined or aggregate total storage capacity of the connected batteries, the controller 110 independently varies each of the switch devices 105a-c (e.g., one-at-a-time or simultaneously) from the connected state to the disconnected state until the power capacity of the connected power source substantially correlates or corresponds to the total storage capacities of the batteries that are connected to the power source to protect the connected batteries from adverse under-voltage conditions and the power source from adverse over-voltage conditions.

Generally, the controller 110 varies the switch devices 105a-c between the connected state and the disconnected state and regulates the power output of the connected power source based on the energy potentials of the connected batteries and the power capacity of the connected power source during the charge phase. Independent and selective control of the switch devices 105a-c provides discrete, dynamic control of the second plurality of batteries 100 during the charge phase such that the total storage capacities of the batteries to be connected by the controller 110 can be varied to suit or correspond to the power capacity of the connected power source, and so that the power output can be tailored to the state of the total stored charges to avoid adverse charging conditions. Tailoring the batteries to the power source in this manner maximizes the available power output from the power source without exceeding the amount of available power or the charging capabilities of the batteries 95a-d, 100a-c.

When the controller 110 determines that the state of the total stored charge of one or more of the second plurality of batteries 100a-c that is connected to the power source indicates a substantially full charge, the controller 110 disconnects the corresponding battery 100a-c from the power source via the switch device 105a-c. In the event that the controller 110 determines other batteries 100a-c are not fully charged based on the respective states of the total stored charges, the controller 110 connects these batteries 100a-c to the power source by varying the associated switch devices 105a-c to the connected state. If these other batteries 100a-c are already connected, the controller 110 maintains the connection until these batteries 100a-c are substantially fully charged.

In some constructions, depending on the power capacity of the power source and the total storage capacities of the batteries 100a-c, two or more batteries 100a-c (i.e., a sub-group of batteries) may be connected to the connected power source at substantially the same time without encountering adverse charge conditions. The controller 110 sequentially connects each battery 100a-c, or alternatively sub-groups of batteries, to the connected power source so that the total stored charge of each battery 100a-c is balanced or so that the batteries 100a-c are charged in a particular order. In some constructions, each battery 100a-c or sub-groups of batteries 100a-c may be substantially simultaneously connected to the power source.

In other constructions, one or more of the batteries 100a-c may be sequentially connected to the power source while other batteries 100a-c may be substantially simultaneously connected to the power source. By independently and selectively connecting each battery 100a-c to the power source, particularized adjustments can be made to optimize charging the first plurality of batteries 95 and the second plurality of batteries 100 based on the respective total storage capacities and the operating conditions. For example, when one or more of the batteries 100a-c has a relatively high total storage capacity (e.g., due to a larger designed charge capacity or a better state of health), this battery 100a-c can be connected to the power source for a greater percentage of time as compared to the remaining batteries 100a-c that have a relatively low total storage capacity (e.g., e.g., a low charge capacity or a poor state of health).

In the discharge phase, the batteries 95a-d are electrically connected to the electrical load to adequately power the load. At the beginning of the discharge phase, some or all of the batteries 100a-c can be connected to the electrical load depending on the load draw and the first total stored charge of the batteries 95a-d. Generally, the controller 110 selectively varies the switch devices 105a-c between the connected state and the disconnected state based on the load draw and the total stored charges of the batteries 95a-d, 100a-c. For example, when the first total stored charge is substantially the same as the power needed to adequately power the load, the batteries 95a-d substantially power the load and the batteries 100a-c are disconnected from the load. In some constructions, the batteries 95a-d may be connected to the electrical load, and the batteries 100a-c may be connected to the power source, or vice versa. That is, the batteries 95a-d may be in the discharge phase (or charge phase) while some or all of the batteries 100a-c may be in the charge phase (or discharge phase).

When the load draw exceeds the first total stored charge by a predetermined load threshold (e.g., when the batteries of the first plurality of batteries 95 have a low state of charge, etc.), the controller 110 varies at least one of the switch devices 105a-c to the connected state to at least partially power the load at least one of the batteries 100a-c. Depending on the difference between the load draw, the first total stored charge, and the total stored charges of the respective batteries 100a-c, the controller 110 may electrically connect some or all of the batteries 100a-c to the electrical load by varying some or all of the respective switch devices 105a-c to the connected state.

When the load draw decreases or is lower than the combined total stored charges of the connected batteries 95a-d, 100a-c during the discharge phase, the controller 110 independently varies each of the switch devices 105a-c (e.g., one-at-a-time or simultaneously) from the connected state to the disconnected state until the load draw substantially matches or corresponds to the total stored charges of the batteries 95a-d, 100a-c that are connected to the load. Generally, the controller 110 varies the switch devices 105a-c between the connected state and the disconnected state during the discharge phase based on the total stored charges of the batteries 95a-d, 100a-c that are connected to the load and the load draw of the load to avoid depleting the energy available in the batteries 95a-d, 100a-c beyond a predetermined discharge threshold so that the charge life of the respective batteries 95a-d, 100a-c are not unnecessarily shortened while still providing adequate power to the load.

Independent and selective control of the switch devices 105a-c provides discrete, dynamic control of each of the batteries 100a-c during the discharge phase such that the total stored charges of the batteries 100a-c to be connected by the controller 110 can be tailored to the load draw to avoid providing inadequate power to the load and to avoid overly depleting the available energy in the respective batteries 100a-c. Tailoring the batteries 95a-d, 100a-c to the electrical load in this manner maximizes the available power to the load without exceeding the amount of available power or the discharging capabilities of the batteries 95a-d, 100a-c.

When the controller 110 determines that the total stored charge of one or more of the batteries 100a-c indicates that the corresponding battery 100a-c has reached or has dropped below the predetermined discharge threshold, the controller 110 disconnects the corresponding battery 100a-c from the load. If possible, the controller 110 connects other batteries 100a-c to the load via the associated switch devices 105a-c to provide adequate power to the load.

In some constructions, depending on the load draw of the load and the total stored charges of the batteries 95a-d, 100a-c, sub-groups of the batteries 100a-c may be connected to the load substantially simultaneously or sequentially. Generally, the controller 110 can sequentially connect each battery 100a-c or sub-groups of the batteries 100a-c to the load so that the power supplied by each battery 100a-c is balanced to the load, or so that power from the batteries 100a-c is provided in a particular order based on the respective total stored charges. In other constructions, one or more of the batteries 100a-c may be sequentially connected to the load while the remaining batteries 100a-c may be substantially simultaneously connected to the load. By independently and selectively connecting and disconnecting each battery 100a-c relative to the load, particularized adjustments can be made to optimize powering the load based on the total stored charges and the operating conditions of the first plurality of batteries 95 and the second plurality of batteries 100. For example, when one or more of the batteries 100a-c has a relatively high total stored charge and a correspondingly high total storage capacity, this battery 100a-c can be connected to the load for a greater percentage of time as compared to other batteries 95a-d, 100a-c that have a either or both of a relatively low total stored charge and a low total storage capacity.

Selective connection and disconnection of the second plurality of batteries 100 using the switch devices 105a-c allows some or all of the batteries 100a-c to be isolated from the load. Isolation of the batteries from the load protects the health of the batteries (e.g., battery life) by limiting the power discharged from the respective batteries to the predetermined discharge threshold. The controller 110 can determine when one or more of the batteries 100a-c has reached or exceeded the predetermined discharge threshold and disconnect those batteries 100a-c from the load to avoid depleting the power stored in the respective batteries 100a-c significantly beyond the predetermined discharge threshold. This independent control allows the batteries 100a-c to be depleted at the same time, or alternatively, allows some of the batteries 100a-c to be isolated for future use (e.g., after first-connected batteries have been depleted to a predetermined amount). In some constructions, the controller 110 may isolate one or more of the batteries 100a-c from the remaining batteries 100a-c so that the isolated batteries may be used to power other loads of the vehicle (e.g., an auxiliary or second, HVAC system, etc.).

The controller 110 selectively and independently controls the electrical power discharged to and from the batteries 100a-c. Each independently controlled battery 100a-c may be disconnected or isolated from the power source after the full total stored charge for the associated battery 100a-c has been reached to prevent damage that may be caused by various factors (e.g., hydrogen out-gassing during the charge phase, inadvertent discharge of the battery by a parasitic load during long term storage, etc.). Each independently controlled battery 100a-c also may be disconnected or isolated from the load after the total stored charge reaches or drops below a predetermined discharge threshold to prevent damage that may be caused by various factors (e.g., inadvertent discharge of the battery by a parasitic load during long term storage, storage of the battery in a low state of charge, etc.).

The controller 110 and the switch devices 105a-c independently and selectively couple each of the batteries 100a-c to the connected power source to allow adequate charging of the batteries 100a-c without drawing excessive power from the connected power source. In this manner, the control system 85 allows variations (e.g., resistance of the battery connections, manufacturing tolerances of the batteries, state of health of the batteries, present state of charge of the batteries, intentional variations of capacity of the batteries, intentional variations of the battery chemistry, variations of battery design or architecture, etc.) among the second plurality of batteries 100 so that the total stored charges of the second plurality of batteries 100 can be tailored to desired operating characteristics of the electrical system, and to allow precise control of electrical power supplied to and discharged from the batteries 95a-d, 100a-c to optimally maintain total storage capacity, total stored charge, and battery life while avoiding adverse charging and discharging conditions. Furthermore, the independent control provided by the control system 85 allows individual batteries 100a-c that are damaged or operating in an out-of-specification condition to be disconnected from the remaining batteries 100a-c.

Various features and advantages of the invention are set forth in the following claims.

What is claimed is:

1. An electrical control system for a vehicle having an electrical load defining a load draw, the control system comprising:
a plurality of electrical storage elements electrically coupled to each other in parallel, each of the plurality of electrical storage elements defining a total storage capacity and having a state of charge cooperatively defining a total stored charge, each of the plurality of electrical storage elements further subject to an over-current condition and an under-current condition and adapted to be in electrical communication with the load and an alternator defining an alternator power capacity and having an alternator output voltage;
a plurality of solid state switch devices electrically coupled to the plurality of electrical storage elements such that each switch device of the plurality of switch devices is associated with a corresponding electrical storage element and operable between a connected state and a disconnected state; and
a controller in electrical communication with the plurality of switch devices to selectively vary each of the switch devices discretely between the connected state and the disconnected state to connect and disconnect one or more of the electrical storage elements relative to the load based on the total stored charges and relative to the alternator to regulate the alternator output voltage.

2. The control system of claim 1, wherein a first electrical storage element of the plurality of electrical storage elements has a first total stored charge that is different from the total stored charges of the remaining electrical storage elements.

3. The control system of claim 2, wherein a second electrical storage element of the plurality of electrical storage elements has a second total stored charge that is smaller than the first total stored charge such that when the first electrical storage element and the second electrical storage element are connected to either the load or the alternator, the first electrical storage element is connected for a longer time period.

4. The control system of claim 1, wherein the plurality of electrical storage elements defines a bank of batteries, and wherein the bank of batteries is connectable in parallel relationship to an existing bank of batteries of the vehicle.

5. The control system of claim 1, wherein the controller is operable to selectively connect one or more of the plurality of electrical storage elements to the load to tailor the total stored charges of the selectively connected electrical storage elements to the load draw.

6. The control system of claim 5, wherein the total stored charges of the selectively connected electrical storage elements substantially correspond to the load draw.

7. The control system of claim 1, wherein the controller is operable to selectively connect one or more of the plurality of electrical storage elements to the alternator to tailor the total storage capacities of the selectively connected electrical storage elements to the alternator power capacity.

8. The control system of claim 7, wherein the total storage capacities of the selectively connected electrical storage elements substantially correspond to the alternator power capacity.

9. The control system of claim 1, wherein the controller is operable to selectively vary at least one of the switch devices to the disconnected state to disconnect the associated electrical storage element from the load when the total stored charge of the associated electrical storage element reaches a predetermined load threshold.

10. The control system of claim 1, wherein the controller is operable to disconnect the corresponding electrical storage element from the alternator when the total stored charge reaches a predetermined charge threshold.

11. The control system of claim 1, wherein the controller is operable to selectively vary at least one of the switch devices to the connected state to connect the corresponding electrical storage element to the load when the load draw exceeds the total stored charges of any connected electrical storage elements by a predetermined load threshold.

12. The control system of claim 1, wherein the controller is operable to selectively vary at least one of the switch devices to the connected state to connect the corresponding electrical storage element to the alternator in response to the alternator power capacity exceeding the total stored charge of any connected electrical storage elements by a predetermined charge threshold.

13. An electrical storage element control system for a vehicle having an electrical load defining a load draw, the control system comprising:
    a first electrical storage element defining a total storage capacity and having a state of charge cooperatively defining a first total stored charge and adapted to be in electrical communication with the load and an alternator defining an alternator power capacity and having an alternator output voltage, the first electrical storage element further subject to a first over-current condition and a first under-current condition;
    a second electrical storage element electrically coupled in parallel relationship to the first electrical storage element, the second electrical storage element defining a total storage capacity and having a state of charge cooperatively defining a second total stored charge and adapted to be in electrical communication with the load and the alternator, the second electrical storage element further subject to a second over-current condition and a second under-current condition;
    a first solid state switch device electrically coupled to the first electrical storage element, the first switch operable between a connected state for connecting the first electrical storage element to the load or the alternator and a disconnected state for disconnecting the first electrical storage element from the load or the alternator;
    a second solid state switch device electrically coupled to the second electrical storage element and operable between a connected state for connecting the second electrical storage element to the load or the alternator and a disconnected state for disconnecting the second electrical storage element from the load or the alternator; and
    a controller in electrical communication with the first switch device and the second switch device and operable to selectively vary the first switch device and the second switch device discretely between the connected state and the disconnected state relative to the alternator to regulate the alternator output voltage, the controller also operable to selectively vary the first switch device and the second switch device discretely between the connected state and the disconnected state relative to the load based on the first total stored charge and the second total stored charge, and further based on the load draw.

14. The control system of claim 13, wherein the controller is operable to sequentially connect the first electrical storage element and the second electrical storage element to the load.

15. The control system of claim 13, wherein the controller is operable to sequentially connect the first electrical storage element and the second electrical storage element to the alternator.

16. The control system of claim 13, wherein the second total stored charge is different from the first total stored charge.

17. The control system of claim 13, wherein the first electrical storage element and the second electrical storage element are substantially simultaneously connected to the load in a discharge phase and the alternator in a charge phase.

18. The control system of claim 13, wherein the controller is operable to sequentially disconnect the first electrical storage element and the second electrical storage element from the load.

19. The control system of claim 13, wherein the controller is operable to sequentially disconnect the first electrical storage element and the second electrical storage element from the alternator.

20. A method of controlling electrical storage elements for a vehicle having an electrical load defining a load draw and an alternator defining an alternator power capacity and having an alternator output voltage, the method comprising:
    providing a plurality of electrical storage elements electrically coupled to each other in parallel, each of the plurality of electrical storage elements defining a total storage capacity and having a state of charge cooperatively defining a total stored charge, each of the plurality of electrical storage elements further subject to an over-current condition and an under-current condition;
    selectively discretely connecting and disconnecting at least one of the plurality of electrical storage elements relative to the load using a solid state switch based on the total stored charge of each of the selectively connected electrical storage elements and the load draw during a discharge phase of the electrical system; and
    selectively discretely connecting and disconnecting at least one of the plurality of electrical storage elements relative to the alternator using a solid state switch to regulate the alternator output voltage.

21. The method of claim 20, further comprising
    tailoring the total stored charges of the selectively connected electrical storage elements to the load draw during the discharge phase; and
    tailoring the total storage capacities of the selectively connected electrical storage elements to the alternator power capacity during the charge phase.

22. The method of claim 20, further comprising selectively sequentially connecting and disconnecting at least some of the plurality of electrical storage elements relative to the load.

23. The method of claim 20, further comprising selectively sequentially connecting and disconnecting at least some of the plurality of electrical storage elements relative to the alternator.

24. The method of claim 20, wherein the plurality of electrical storage elements are a first plurality of electrical storage elements, further comprising
- providing a second plurality of electrical storage elements; and
- connecting the second plurality of electrical storage elements in parallel with the first plurality of electrical storage elements.

25. A method of controlling an alternator output voltage of an alternator for an electrical storage element control system of a vehicle during a charge phase, the alternator defining an alternator power capacity, the method comprising:
- providing a plurality of electrical storage elements electrically coupled to each other in parallel, each of the plurality of electrical storage elements defining a total storage capacity and having a state of charge cooperatively defining a total stored charge;
- determining a state of the total stored charge of each of the plurality of electrical storage elements, the state including one of an over-current condition and an under-current condition of each of the plurality of electrical storage elements;
- selectively discretely connecting and disconnecting at least one of the plurality of electrical storage elements to the alternator using a solid state switch in response to one of the over-current condition and the under-current condition and the alternator power capacity,
- thereby regulating the alternator output voltage; and
- charging at least one selectively connected electrical storage element.

26. The method of claim 25, further comprising
- determining the state of the total stored charge of the at least one selectively connected electrical storage element below a charge threshold; and
- decreasing the output of the alternator in response to the state of the total stored charge below the charge threshold to limit at least one of the current and the voltage into the at least one selectively connected electrical storage element.

27. The method of claim 25, further comprising
- determining the state of the total stored charge of the at least one selectively connected electrical storage element above a charge threshold; and
- increasing the output of the alternator in response to the state of the total stored charge above the charge threshold to charge the at least one selectively connected electrical storage element without exceeding the power output of the alternator.

28. The method of claim 27, further comprising
- determining that the at least one selectively connected electrical storage element has reached a state of total stored charge indicative of a full state of charge; and
- decreasing the output of the alternator to the at least one selectively connected electrical storage element.

29. The method of claim 28, further comprising disconnecting the at least one selectively connected electrical storage element from the alternator.

30. The method of claim 25, further comprising connecting at least two of the plurality of electrical storage elements having different total storage capacities to the alternator, and wherein charging the at least one selectively connected electrical storage element includes synchronizing the at least two of the plurality of electrical storage elements based on the respective total storage capacities.

31. A method of controlling an output of an alternator for an electrical storage element control system of a vehicle during a charge phase, the alternator defining an alternator power capacity, the method comprising:
- providing a plurality of electrical storage elements electrically coupled to each other in parallel, each of the plurality of electrical storage elements defining a total storage capacity and having a state of charge cooperatively defining a total stored charge;
- determining a state of the total stored charge of each of the plurality of electrical storage elements;
- selectively connecting at least one of the plurality of electrical storage elements to the alternator using a solid state switch based on the state of the total stored charge of the at least one selectively connected electrical storage element and the alternator power capacity;
- charging the at least one selectively connected electrical storage element;
- determining the state of the total stored charge of the at least one selectively connected electrical storage element below a charge threshold; and
- decreasing the output of the alternator in response to the state of the total stored charge below the charge threshold to limit at least one of the current and the voltage into the at least one selectively connected electrical storage element.

\* \* \* \* \*